Patented Oct. 17, 1922.

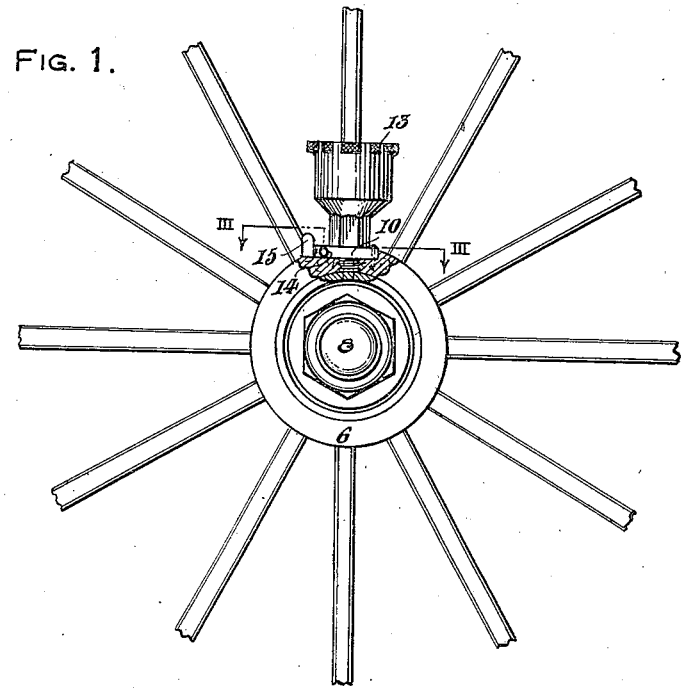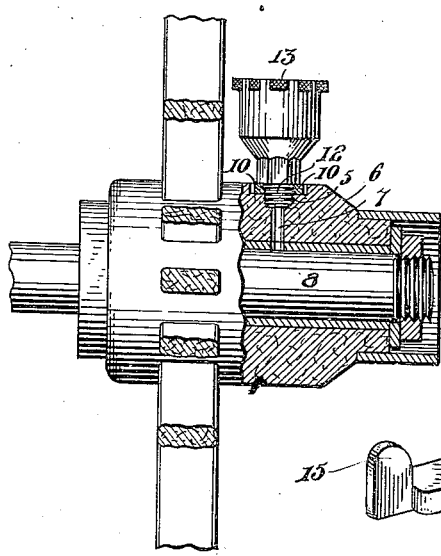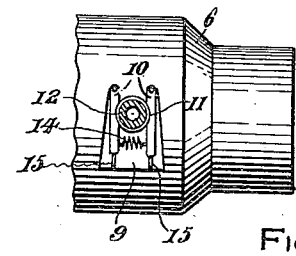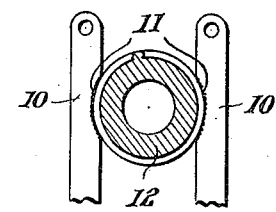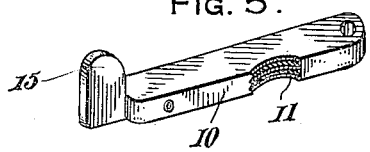

1,432,716

UNITED STATES PATENT OFFICE.

ALBERT J. MIGL, OF YOAKUM, TEXAS.

GREASE-CUP-ATTACHING MEANS.

Application filed July 11, 1921. Serial No. 483,893.

*To all whom it may concern:*

Be it known that I, ALBERT J. MIGL, a citizen of the United States of America, residing at Yoakum, in the county of Lavaca and State of Texas, have invented certain new and useful Improvements in Grease-Cup-Attaching Means, of which the following is a specification.

This invention relates to certain new and useful improvements in grease cup attaching means particularly adaptable for the mounting of grease cups upon wheel hubs or the like.

The primary object of the invention is to prevent loss of grease cups as well as to permit quick attachment or detachment of the same to and from hubs of wheels.

With the above general object in view and others that will become apparent as the nature of the invention is better understood, the invention consists in the novel form, combination and arrangement of parts hereinafter more fully described and shown in the accompanying drawings, in which like designating characters refer to corresponding parts throughout the several views.

In the drawings,

Figure 1 is a fragmentary view partly in side elevation and partly in section of a wheel equipped with a grease cup and attaching means in accordance with the present invention, Figure 2 is a view taken at right angles to Figure 1 and showing the hubs and threaded jaws partly in section, Figure 3 is a horizontal sectional view taken upon line III—III of Figure 1, Figure 4 is an enlarged fragmentary detail view of the device shown in Figure 3 with the hub removed, and Figure 5 is an enlarged perspective view of one of the spring pressed jaws.

Referring more in detail to the several views, the present invention embodies the provision of a threaded socket as at 5 in one side of a supporting member 6 and in alinement with an oil hole 7 which leads to the member 8 to be lubricated, the supporting member 6 being shown as the hub of a wheel and the member to be lubricated being illustrated as an axle. The hub 6 is provided with an enlarged recess 9 in its outer surface about the socket 5 and a pair of pivoted jaws 10 are mounted within the recess 9 so as to swing toward and away from each other transversely of the socket 5, said jaws 10 being formed with threads as at 11 adapted to engage similar threads at opposite sides of the threaded stem 12 of a conventional form of grease cup 13, which stem 12 is adapted to be screwed into the socket 5. The socket 5 is made relatively shallow so that only a couple of turns upon the grease cup is necessary to seat the stem 12 in said socket with the remaining portion of the stem 12 held between the threaded portions of the jaws 10. Backing of the stem 12 out of the socket 5 is prevented by connecting the outer ends of the jaws 10 with a relatively strong tension spring 14 which draws said jaws together so as to tightly engage their threaded portions with the opposite sides of the stem 12 while permitting said jaws to be manually separated so that quick and easy removal of the grease cup may be had. Thus, the jaws 12 provide means for guarding against loss of the grease cup as oftentimes happens from vibration and jar and permits a quick detachment and attachment of the grease cup when desired.

The free ends of the jaws 10 may be provided with outwardly extending finger pieces 15 for convenient separation of said jaws, the remaining portions of which preferably lie flush with the outer surfaces of the hub 6 so as to not readily be damaged or to catch in a person's clothing.

It is believed that the construction as well as the manner of use and the advantages will be readily appreciated from the foregoing description by those skilled in the art.

Minor changes may be made without departing from the spirit and scope of the invention as claimed.

What is claimed as new is:

1. In combination with a supporting member having a relatively hollow threaded socket and provided with a recess in its outer face about said socket, a grease cup having a threaded stem adapted to be seated in the socket by screwing the same a slight amount and to present a threaded portion within the recess, a pair of hinged jaws having threaded portions arranged to engage opposite sides of the threaded stem when swung toward each other, said jaws being pivoted at adjacent ends in said recess, and yieldable means normally causing movement of the jaws toward each other.

2. In combination with a supporting member having a relatively hollow threaded socket and provided with a recess in its outer face about said socket, a grease cup having a threaded stem adapted to be seated in the socket by screwing the same a slight amount and to present a threaded portion within the recess, a pair of hinged jaws having threaded portions arranged to engage opposite sides of the threaded stem when swung toward each other, said jaws being pivoted at adjacent ends in said recess, yieldable means normally causing movement of the jaws toward each other, said yieldable means including a tensioned spring arranged between and connected to the outer end portions of said jaws, and finger pieces upon the extreme outer ends of said jaws.

3. In combination with a grease cup having a threaded stem, a supporting member for the grease cup having a recess and a relatively smaller shallow socket, the inner end of said stem being adapted to seat within said socket, a pair of jaws pivoted within the recess at opposite sides of said stem and having threaded portions adapted to engage opposite sides of the stem when swung toward each other with the stem seated in said socket and yieldable means normally drawing the jaws toward each other.

In testimony whereof I affix my signature.

ALBERT J. MIGL.